United States Patent Office 3,557,214
Patented Jan. 19, 1971

3,557,214
PRODUCTION OF MONOQUATERNARY
AMMONIUM HALIDES
Karl-Heinz Koenig and Horst Pommer, Ludwigshafen (Rhine), Germany, assignors to Badische Anilin- & Soda-Fabrik Aktiengesellschaft, Ludwigshafen (Rhine), Germany
No Drawing. Filed Mar. 28, 1967, Ser. No. 626,421
Claims priority, application Germany, Mar. 31, 1966, 1,543,341
Int. Cl. C07c 85/04
U.S. Cl. 260—567.6                                     5 Claims

ABSTRACT OF THE DISCLOSURE

Production of monoquaternary ammonium halides by reacting tertiary amines with α,ω-dihaloalkanes having more than 2 carbon atoms or with unsubstituted or substituted 1,2-dihaloethanes in the presence of water at 30 to 150° C. The halogen compounds, tertiary amines and water are used in the molar ratio of from 0.5:1:0.1 to 40:1:40. The products are suitable for regulating the growth height of plants.

---

This invention relates to an improved method of producing monoquaternary ammonium halides.

It is known that trimethyl-(β-chloroethyl)-ammonium chloride may be obtained by reacting trimethyl-(β-hydroxyethyl)-ammonium chloride with thionyl chloride or hydrogen halide under pressure. Trimethyl-(β-hydroxyethyl)-ammonium chloride is known to be obtained by reaction of dimethylamine with ethylene oxide followed by quaternization of the reaction product with methyl chloride. These processes, however, are expensive because they proceed via a plurality of steps and use highly corrosive reagents. It is furthermore known (Ann., vol. 337, 84 (1904)) that 1,2-dibromoethane reacts with trimethylamine in alcoholic solution at 50° C. to form trimethyl-(β-bromoethyl)-ammonium bromide. The higher dihaloalkanes, particularly the chlorine compounds, react however only very slowly at this temperature. When using higher temperatures, e.g. 100° C., diquaternary compounds and a number of other reaction products are formed in addition to the monoquaternary ammonium salts (loc. cit., p. 85). German Pat. 1,049,388 describes a process for the manufacture of monoquaternary ω-haloalkylammonium halides. This process must however be carried out in an anhydrous medium, which in commercial operation involves great expense for equipment. Moreover, the ammonium compound is obtained as an oily crystal slurry which is very difficult to isolate.

It is an object of the present invention to provide a process which gives unitary monoquaternary ammonium halides in a high yield. Another object of the invention is to provide a process in which the monoquaternary ammonium halides are readily isolated. A further object of the invention is to provide a process in which the starting materials may contain water.

In accordance with the present invention these and other objects and advantages are achieved and monoquaternary ammonium halides of the general formula

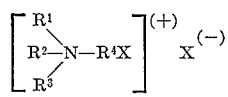  (I)

where $R^1$ is an aliphatic, cycloaliphatic, araliphatic or aromatic radical, $R^2$ and $R^3$ are lower aliphatic hydrocarbon radicals which together with the nitrogen atom to which they are attached may form a five- to seven-membered heterocyclic ring, $R^4$ is a straight-chain alkylene radical with more than 2 carbon atoms or the radical

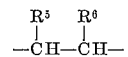

where $R^5$ is a hydrogen atom, a lower aliphatic hydrocarbon radical or a phenyl radical, or a cyano, carboxyl, carbalkoxy, acyl or acyloxy group or an alkoxy group having from 1 to 4 carbon atoms and $R^6$ is a hydrogen atom, a lower aliphatic hydrocarbon radical or a carboxy or carbalkoxy group, $R^5$ and $R^6$ together with the carbon atoms to which they are attached may be joint members of a 5- to 12-membered cycloaliphatic ring and X is chlorine or bromine are obtained by reacting dihalo compounds of the formula $$X—R^4—X \qquad (II)$$

where $R^4$ and X have the meanings given above with tertiary amines of the formula

 (III)

where $R^1$, $R^2$ and $R^3$ have the meanings given above, at temperatures of 30 to 150° C. in the presence of water, the dihalo compound, tertiary amine and water being used in a molar ratio of 0.5:1:0.1 to 40:1:40.

The process is remarkable in that diquaternary ammonium compounds are not formed despite the presence of water and the use of elevated temperature, and there is no elimination of hydrogen halide.

In the preferred starting materials II and consequently in the preferred products I $R^4$ is a straight-chain alkylene radical having from 3 to 12 carbon atoms, especially 3 to 6 carbon atoms, or the radical

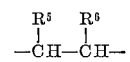

where $R^5$ is a hydrogen atom, an alkyl radical having from 1 to 6 carbon atoms, especially 1 or 2 carbon atoms, or a phenyl radical, and also a cyano, carboxyl or carbalkoxy group with from 2 to 11 carbon atoms, particularly 2 to 9 carbon atoms, an acyloxy group which is derived from fatty acids having from 1 to 10 carbon atoms, especially 1 to 3 carbon atoms, an acyl group having from 1 to 10 carbon atoms, especially 1 to 3 carbon atoms, or an alkoxy radical with 1 to 4 carbon atoms; $R^6$ is a hydrogen atom, an alkyl radical with 1 to 4 carbon atoms, especially 1 or 2 carbon atoms, or a carboxyl or carbalkoxyl group with 2 to 11 carbon atoms, especially 1 to 8 carbon atoms; $R^5$ and $R^6$ may also be joint members of a 5- to 12-membered cycloalkane ring together with the carbon atoms to which they are attached. Starting materials II in which $R^5$ and $R^6$ are hydrogen atoms have achieved special importance, X in the said starting materials II being chlorine or bromine. Examples of suitable materials are 1,2-dichloroethane, 1,3-dichloropropane, 1,4-dibromobutane, 1,6-dichlorohexane, 1,7-dibromoheptane, 1,10-dichlorodecane, 1,12-dibromododecane, 1,2-dichloropropane, 1,2-dibromocyclohexane, 1,2-dichlorocyclooctane, 1,2-dichlorocyclododecane, 2,3-dibromobutane, 1,2-dibromooctane, 1,2-dibromoethane, 1-cyano-1,2-dichloroethane, methyl 1,2-dichloropropionate, methyl 1,2-dibromopropionate, 1,2-dibromoethyl acetate, 1,2-dichloroethyl propionate, 1,2-dichloroethyl propionate, 1,2-dichloro-1-phenylethane, 1,2-dibromo-1-phenylethane, 1-methoxy-1,2-dibromoethane, 1-isobutoxy-1,2-dichloroethane, methyl 1,2-dibromo succinate, methyl 1,2-dichloro-1-methyl propionate or 1,2-dibromobutanone-(3).

In the tertiary amines which are used as preferred starting materials III $R^1$ is an aliphatic, cycloaliphatic, araliphatic or aromatic radical with up to 18 carbon atoms e.g. alkyl of 1 to 18 carbon atoms. The said radicals may, in the non-aromatic portions, have hydrocarbon structure with monoolefinic or diolefinic unsaturation, or they may contain 1 or 2 inert groups or atoms, such as carbalkoxy radicals with 2 to 11, especially 2 to 9, carbon atoms or hydroxyl groups or alkoxy groups with 1 to 4 carbon atoms. In particular, $R^1$ is an aliphatic radical with 1 to 8 carbon atoms which may contain monoolefinic or diolefinic unsaturation and/or be substituted as described above, a cycloalkyl radical with 6 to 8 carbon atoms or the phenyl radical; $R^2$ and $R^3$ denote alkyl radicals with from 1 to 4 carbon atoms which, together with the nitrogen atom to which they are attached, may form a five- to seven-membered heterocyclic ring. Examples of suitable tertiary amines are trimethylamine, triethylamine, dibutylmethylamine, dimethylaniline, diethylbenzylamine and N-butylpyrrolidine.

The reaction proceeds at temperatures of from 30 to 150° C., the temperature range between 70 and 100° C. being preferred.

One of the essential features of the process of this invention is that starting materials II and III and water are mixed during the reaction in the molar ratio of from 0.5:1:0.1 to 40:1:40. Molar ratios of from 3:1:0.2 to 10:1:15 are preferred. The said molar ratios relate to the amounts actually mixed. In continuous operation, starting materials are continuously supplied and product is withdrawn in aqueous solution. In accordance with the composition of the final product the starting materials II and III are used up in approximately molar amounts.

The process of the invention may for example be carried out by pumping dihalohydrocarbons and tertiary amines and water, or aqueous tertiary amine solutions, in the said ratio and at the said temperatures by means of metering pumps through a mixing nozzle into a vessel in which the mean residence time is advantageously 5 to 300 minutes and in which the reactants are intimately mixed. The discharged solution separates into two phases in a separator. Unreacted dihalohydrocarbons are recycled to the reaction, whereas the monoquaternary ammonium halides are separated from the aqueous solution by evaporation. It is also possible to use the ammonium salts in the form of the aqueous solutions in which they are obtained.

According to another embodiment of the process dihalohydrocarbons are placed in a high reaction vessel and water and tertiary amine or an aqueous solution of a tertiary amine, are metered in from below in fine distribution. An aqueous solution of the monoquaternary ammonium salt separates on the dihalohydrocarbon which is continuously withdrawn and worked up. The amount of dihalohydrocarbon is kept constant by supplying makeup.

According to a particularly simple embodiment dihalohydrocarbons are placed in a high agitated vessel, a layer of water is added and tertiary amines are metered in from below in fine distribution, care being taken to ensure that an appropriate amount of water is mixed with the dihalohydrocarbon and the amine, for example by stirring. The monoquaternary ammonium salt builds up in the aqueous layer. The aqueous solution is continuously withdrawn. Makeup must be added for both the water and the dihalohydrocarbon used up.

In the two last-mentioned continuous processes in which the reaction and subsequent phase separation are carried out in a single reaction vessel, the amine is also mixed with a dihalohydrocarbon and water. For the purpose of determining the above-mentioned molar ratio, the amount of amine supplied per hour, the dihalohydrocarbon present in the reaction zone and the water dissolved therein or intimately mixed therewith are taken into account, not however the upper aqueous phase that occurs for example in the second of the said continuous methods.

The compounds obtainable according to this invention are suitable for regulating the growth height of plants. Chlorocholine chloride, for example, may be used for regulating the growth height of wheat (cf. Zeitschrift für Pflanzenkrankheiten, 1965, p. 375). The other products have similar action when appropriately applied.

The invention is further illustrated by, but not limited to, the following examples in which the parts are by weight.

EXAMPLE 1

A vertically arranged tubular reaction vessel is charged with 100 parts of 1,2-dichloroethane and then a layer of 50 parts of water is added. The 1,2-dichloroethane layer is heated to 70 to 75° C. with steam from outside and mixed with some of the water by stirring. Then 10 parts of gaseous trimethylamine is passed in per hour through a fritted glass disk at the bottom of the vessel. The reactants are intimately mixed by stirring. The water content of the dichloroethane phase is approx. 0.5 part of water per 100 parts of dichloroethane (at 70° C.). The trimethyl-($\beta$-chloroethyl)ammonium chloride builds up in the aqueous layer and is continuously withdrawn as an aqueous solution. The amounts of water and 1,2-dichloroethane are kept constant by supplying makeup. 23.5 parts of trimethyl-($\beta$-chloroethyl)ammonium chloride of the boiling point 240° C. is obtained per hour from the aqueous solution by evaporation. The yield is 91% of the theory, based on trimethylamine.

EXAMPLE 2

148 parts of a 40% by weight aqueous trimethylamine solution and 495 parts of 1,2-dichloroethane are heated for six hours at 75° C. with intensive agitation. 143 parts (=90.5% of the theory) of trimethyl-($\beta$-chloroethyl) ammonium chloride is obtained by evaporating the aqueous phase.

The dihalohydrocarbons specified in the following table have been reacted with tertiary amines analogously to Example 1.

| Example | Dihalohydrocarbon | tert. Amine | Reaction product | M.P., ° C. | Yield, percent |
|---|---|---|---|---|---|
| 3 | 1,2-dibromoethane | Trimethylamine | Trimethyl-($\beta$-bromoethyl)-ammonium bromide. | 238–239 | 8 |
| 4 | 1,6-dibromohexane | do | Trimethyl-($\omega$-bromohexyl)-ammonium bromide. | 99 | 81 |
| 5 | 1,3-dibromopropane | N-methylpyrrolidine | N-methyl-N-($\gamma$-bromopropyl)-pyrrolidinium bromide. | 175 | 84 |
| 6 | 1,2-dibromoethane | N-isopropyl dimethylamine | N,N-dimethyl-N-isopropyl-N-($\beta$-bromoethyl)-ammonium bromide. | 188–189 | |
| 7 | 1,2-dichloroethane | do | N,N-dimethyl-N-isopropyl-N-($\beta$-chloroethyl)-ammonium chloride. | 219–220 | |
| 8 | do | N-cyclohexyl dimethylamine | N,N-dimethyl-N-cyclohexyl-N-($\beta$-chloroethyl) ammonium chloride. | 159–160 | |
| 9 | do | N-($\beta$-hydroxyethyl) dimethylamine | N,N-dimethyl-N-($\beta$-hydroxyethyl)-N-($\beta$-chloroethyl)-ammonium bromide. | 133–134 | |
| 10 | do | N-buten-(2,3)-yl dimethylamine | N,N-dimethyl-N-(buten-(2,3)-yl)-N-($\beta$-chloro- | 130–131 | |

| Example | Dihalohydrocarbon | tert. Amine | Reaction product | M.P., °C. | Yield, percent |
|---|---|---|---|---|---|
| 11 | 1,2-dibromoethane | N-(-hydroxypropyl) dimethylamine | N,N-dimethyl-N-(γ-hydroxypropyl)-N-(β-bromoethyl)-ammonium bromide. | 155-156 | |
| 12 | 1,2-dichloroethane | N-allyl dimethylamine | N,N-dimethyl-N-allyl-N-(β-chloroethyl)-ammonium chloride. | 173-174 | |
| 13 | do | N-(-hydroxypropyl)-dimethylamine | N,N-dimethyl-N-(γ-hydroxypropyl)-N-(β-chloroethyl)-ammonium bromide. | 97-98 | |
| 14 | 1,2-dibromoethane | N-tridecyl-dimethylamine | N,N-dimethyl-N-tridecyl-N-(γ-bromoethyl)-ammonium bromide. | (¹) | |
| 15 | 1,2-dichloroethane | N-methyl-diethylamine | N,N-diethyl-N-methyl-N-(β-chloroethyl)-ammonium chloride. | 218-219 | |

¹ Waxy.

We claim:
1. A process for the production of a monoquaternary ammonium halide of the formula

$$\left[ \begin{array}{c} R^1 \\ R^2-N-R^4X \\ R^3 \end{array} \right]^{\oplus} X^{\ominus} \quad (I)$$

wherein
R¹ represents alkyl of 1 to 18 carbon atoms, alkenyl of 3 to 4 carbon atoms, hydroxyalkyl of 2 to 3 carbon atoms, cyclohexyl and phenyl,
R² and R³ taken separately represent alkyl of 1 to 4 carbon atoms and taken together form the alkylene bridge of a 5- to 7-membered heterocyclic ring including the nitrogen atom attached thereto,
R⁴ represents alkylene of 2 to 12 carbon atoms or the divalent ethylene radical $$\begin{array}{c} R^5 \ R^6 \\ | \ \ | \\ -CH-CH- \end{array}$$

in which R⁵ is hydrogen or carbmethoxy,
R⁶ is alkoxy of 1 to 4 carbon atoms, carbmethoxy, carbethoxy, cyano or phenyl, and in which R⁵ and R⁶ when taken together with the ethylene bridge form a 5- to 12-membered cycloalkane ring, and
X is chlorine or bromine, which process comprises: reacting a dihalo compound of the formula $$X-R^4-X \quad (II)$$

with a tertiary amine of the formula $$\begin{array}{c} R^1 \ \ \ \ R^2 \\ \diagdown \ \diagup \\ N \\ | \\ R^3 \end{array} \quad (III)$$

wherein R¹, R², R³, R⁴ and X have the meanings given above, at a temperature of 70° C. to 100° C. in the presence of water and mixing the dihalo compound, tertiary amine and water in a molar ratio of 3:1:0.2 to 10:1:15, and separating an aqueous phase containing the monoquaternary ammonium halide product.

2. A process as claimed in claim 1 wherein R¹ is alkyl of 1 to 13 carbon atoms, R² and R³ each represent methyl or ethyl, R⁴ represents a straight chain alkylene of 2 to 6 carbon atoms and X is chlorine or bromine.

3. A process as claimed in claim 1 wherein the starting material of the Formula II is 1,2-dichloroethane or 1,2-dibromoethane.

4. A process as claimed in claim 1 wherein the dihalo compound II is 1,2-dichloroethane and the tertiary amine III is trimethylamine.

5. A process as claimed in claim 1 wherein the dihalo compound II is 1,2-dibromoethane and the tertiary amine III is trimethylamine.

References Cited

UNITED STATES PATENTS 2,817,664   12/1957   Cavallito et al. _____ 260—293

FOREIGN PATENTS 48,619   6/1966   Germany _____ 260—567.6

OTHER REFERENCES

Hofmann, Chemisches Central Blatt, No. 58, pp. 913–915 (1858).

BERNARD HELFIN, Primary Examiner

G. A. SCHWARTZ, Assistant Examiner

U.S. Cl. X.R.

260—239, 293, 294.3, 313.1, 326.3, 326.62, 464

PO-1050
(5/69)

UNITED STATES PATENT OFFICE
CERTIFICATE OF CORRECTION

Patent No. 3,557,214            Dated January 19, 1971

Inventor(s) Karl-Heinz Koenig et al

It is certified that error appears in the above-identified patent and that said Letters Patent are hereby corrected as shown below:

Column 4, in the table, under "Yield, percent", Example 3, "8" should read -- 86 --.

Signed and sealed this 8th day of June 1971.

(SEAL)
Attest:

EDWARD M. FLETCHER, JR.            WILLIAM E. SCHUYLER, JR.
Attesting Officer            Commissioner of Patents